United States Patent [19]
Okazaki et al.

[11] Patent Number: 4,982,993
[45] Date of Patent: Jan. 8, 1991

[54] MOVABLE COWL COVER

[75] Inventors: Susumu Okazaki; Takeshi Yamamoto; Shinshi Kajimoto; Takeshi Konishi, all of Hiroshima; Naogi Hisanaga; Takahiko Tanaka, both of Kosai, all of Japan

[73] Assignees: Mazda Motor Corporation, Hiroshima; Asmo Co., Ltd., Shizuoka, both of Japan

[21] Appl. No.: 234,225

[22] Filed: Aug. 2, 1988

[30] Foreign Application Priority Data

Aug. 6, 1987 [JP] Japan .................. 62-198944

[51] Int. Cl.⁵ .................................... B62D 25/10
[52] U.S. Cl. ........................... 296/192; 15/250.19
[58] Field of Search .................... 296/192, 194; 15/250.16, 250.17, 250.19

[56] References Cited

U.S. PATENT DOCUMENTS

| 2,895,157 | 7/1959 | Kocourek | 15/253 |
| 3,226,756 | 1/1966 | Heiler | 15/250.19 |
| 3,688,332 | 9/1972 | Bellware | 15/250.16 |
| 3,694,846 | 10/1972 | Parker | 15/250.16 |

FOREIGN PATENT DOCUMENTS

| 0231580 | 8/1987 | European Pat. Off. | |
| 2852187 | 6/1980 | Fed. Rep. of Germany | 15/250.17 |
| 3437556 | 5/1985 | Fed. Rep. of Germany | 296/192 |
| 1544790 | 11/1968 | France | 15/250.17 |
| 57-158556 | 10/1982 | Japan | |
| 60-93555 | 6/1985 | Japan | |

Primary Examiner—Dennis H. Pedder
Attorney, Agent, or Firm—Sixbey, Friedman, Leedom & Ferguson

[57] ABSTRACT

A cowl box is provided in a vehicle body between a rear edge of an engine hood and a windshield. The front hood is mounted on the vehicle body to be swung open and closed about a hinge mounted on the vehicle body on the rear side of the rear edge of the front hood. The cowl cover is opened and closed by a driving mechanism comprising a four-bar link mechanism including first and second links each of which is pivoted at one end thereof on a member mounted on the front hood and at the other end on the lower surface of the cowl cover and which extend substantially in parallel spaced from each other in the longitudinal direction of the vehicle body, a driving motor and a connecting mechanism for transmitting the output power of the driving motor to the four-bar link mechanism.

19 Claims, 15 Drawing Sheets

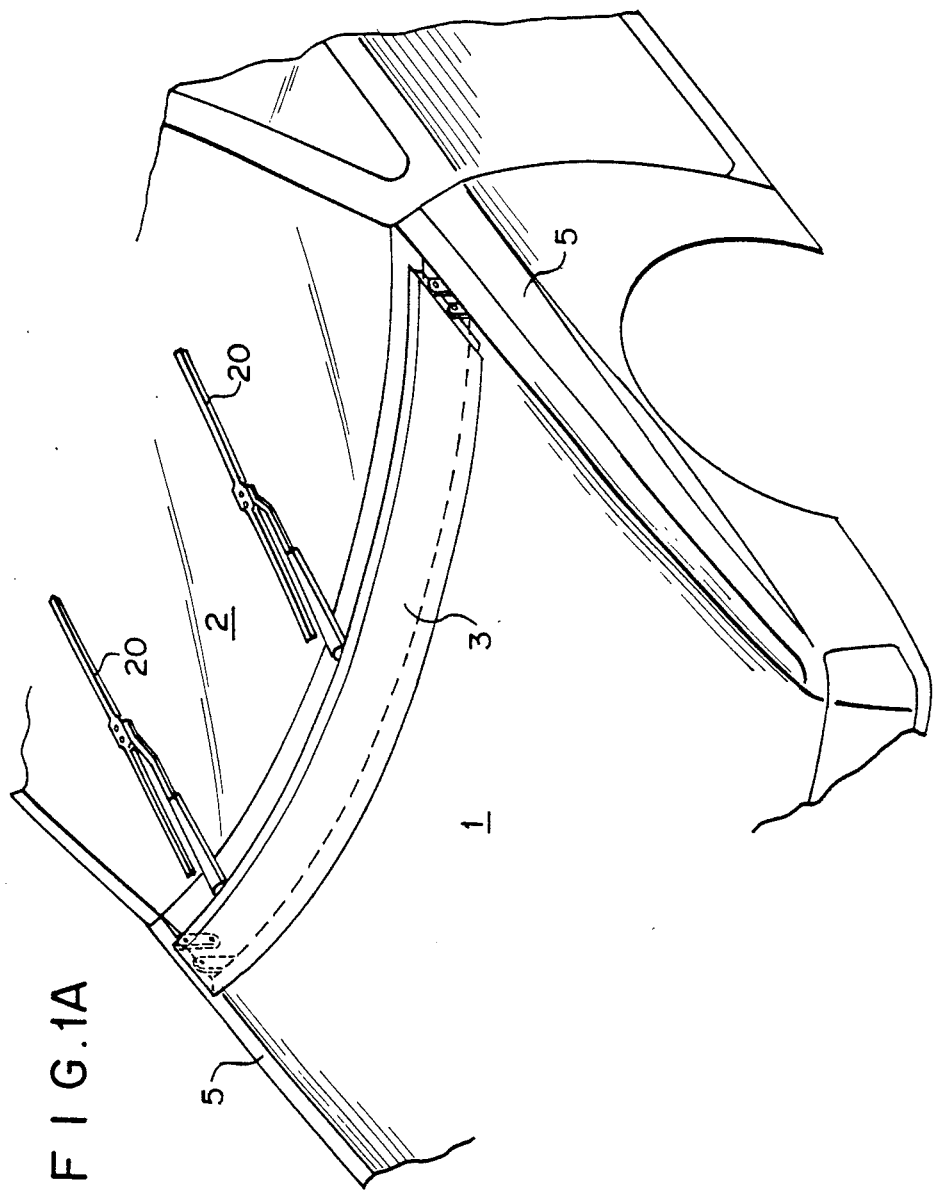

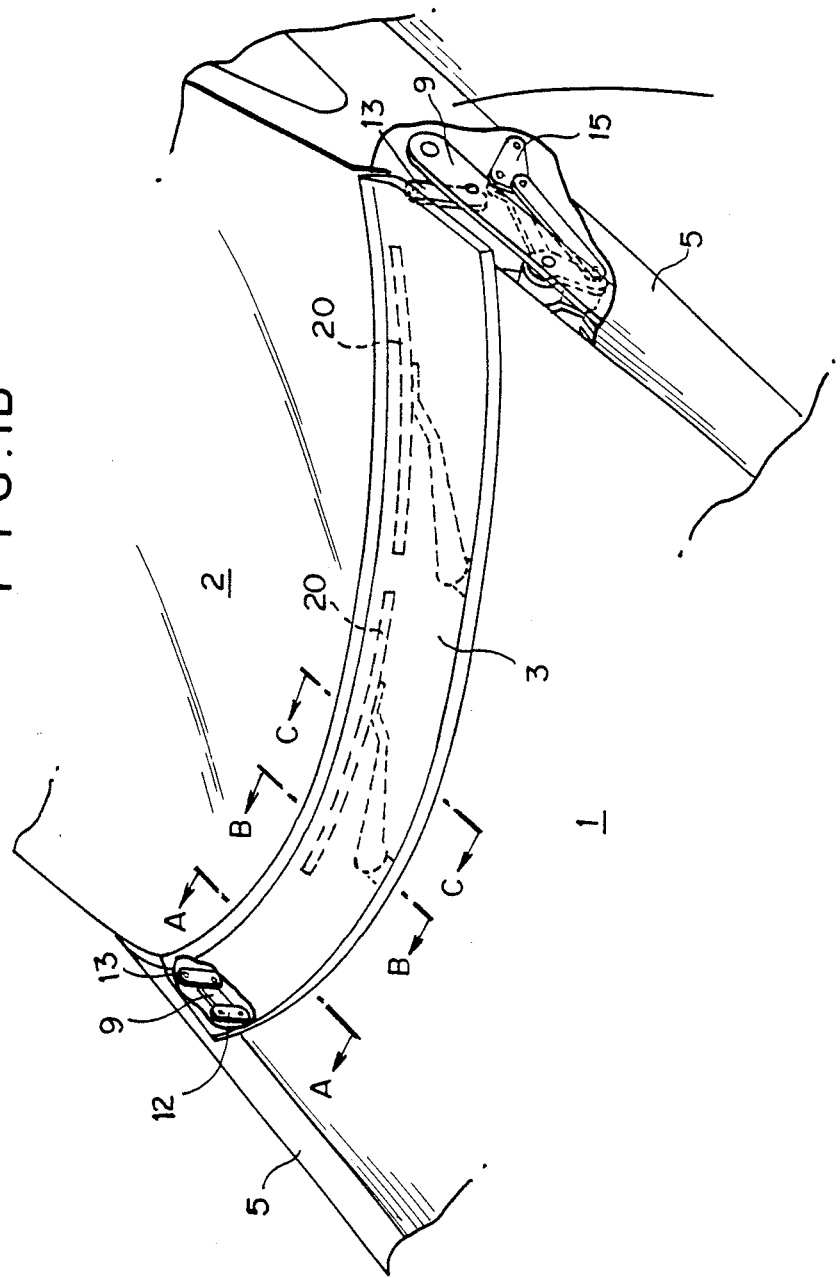

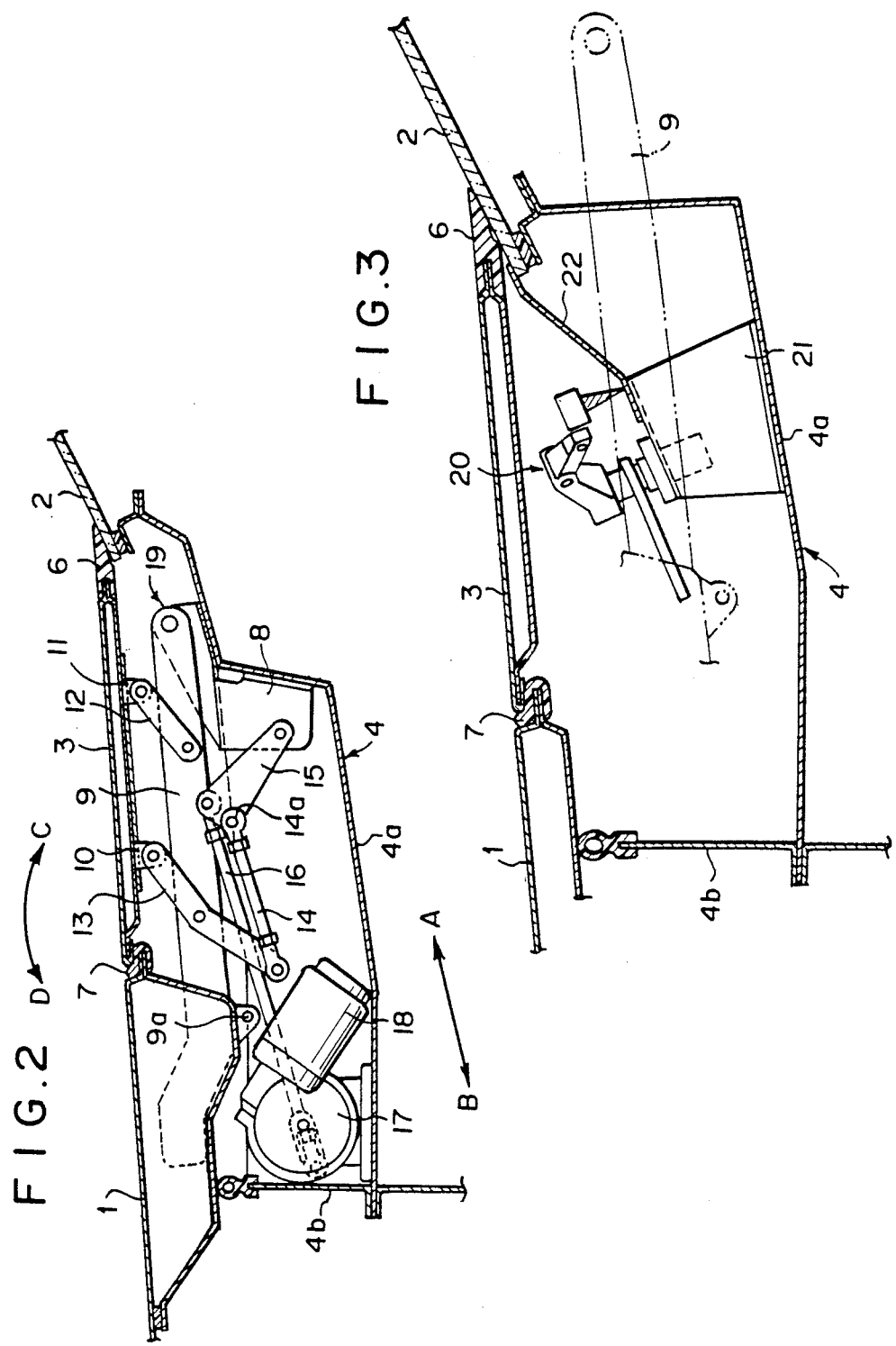

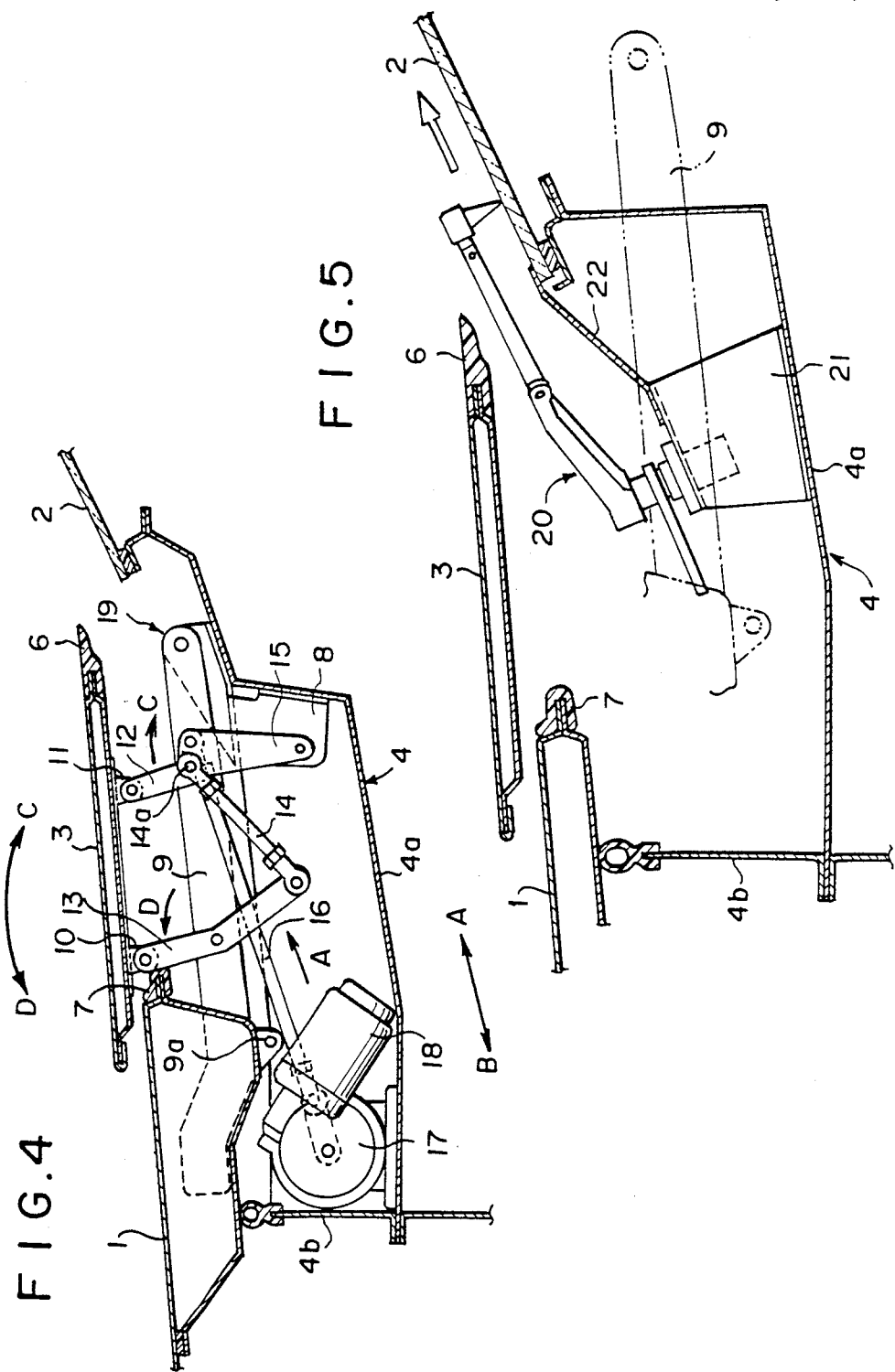

MOVABLE COWL COVER

BACKGROUND OF THE INVENTION

1. Field of the Invention

This invention relates to a movable cowl cover for a vehicle.

2. Description of the Prior Art

There has been known a movable cowl cover for opening and closing a cowl box provided in front of the windshield. Wiper blades are housed in the cowl box when the wiper system is not in operation and the cowl cover is closed to improve the aerodynamic properties and the appearance of the vehicle, and when the wiper system is to be operated, the cowl cover is opened to permit the wiper blades to go outside the cowl box.

For example, in the movable cowl cover disclosed in U.S. Pat. No. 3694846, a slider of the cowl cover is mounted on the engine hood and the cowl cover is moved downward into the cowl box to open. In the cowl box disclosed in Japanese Unexamined Patent Publication No. 57(1982)-158556, a link mechanism for driving the cowl cover is mounted on the vehicle body and the cowl cover is moved downward and forward into the cowl box to open. These types of the movable cowl box are disadvantageous in that the cowl box must be large in volume in order to accommodate the cowl cover when it is opened. In the movable cowl cover disclosed in Japanese Unexamined Patent Publication No. 60(1985)-93555, a link mechanism for driving the cowl cover is mounted on the vehicle body and the cowl cover is moved upward to open. This type of the movable cowl cover is disadvantageous in that when the engine hood is opened with the cowl box being kept open, the engine hood interferes with the cowl cover, and accordingly, the engine hood must be opened after the wipers are stopped and the cowl cover is closed. Further, in the type in which the engine hood and the cowl cover are separately mounted on the vehicle body as those disclosed in the Japanese unexamined patent publications described above, it is difficult to position the rear edge of the engine hood and the front edge of the cowl cover with a high accuracy relative to each other, and at the same time, when a failure occurs in the driving mechanism of the cowl cover, the cowl cover must be removed for repair.

SUMMARY OF THE INVENTION

In view of the foregoing observations and description, the primary object of the present invention is to provide a movable cowl cover which permits the engine hood to be opened with the cowl cover being kept opened, facilitates positioning of the cowl cover and the engine hood with a high accuracy relative to each other and permits repair of the driving mechanism of the cowl cover without removing the cowl cover.

In accordance with the present invention, there is provided a movable cowl cover for selectively opening and closing a cowl box provided in a vehicle body between a rear edge of a front hood and a windshield, the front hood being mounted on the vehicle body to be swung open and closed about a hinge mounted on the vehicle body on the rear side of the rear edge of the front hood, said cowl cover characterized by being opened and closed by a driving mechanism comprising a four-bar link mechanism including first and second links each of which is pivoted at one end thereof on a member mounted on the front hood and at the other end on the lower surface of the cowl cover and which extend substantially in parallel spaced from each other in the longitudinal direction of the vehicle body, a driving means and a connecting mechanism for transmitting the output power of the driving means to the four-bar link mechanism.

In accordance with the present invention, since the cowl cover is pivoted on the hood, the hood cannot interfere with the cowl cover even if the hood is opened with the cowl cover having been opened. Further, since the cowl cover is pivoted on the hood, the hood and the cowl cover can be unitized, whereby the hood and the cowl cover can be incorporated with the vehicle body more easily and the hood and the cowl cover can be positioned with a higher accuracy relative to each other. Further, since the cowl cover is adapted to be swung together with the hood, the cowl cover driving mechanism can be repaired without removing the cowl cover in the case of failure by opening the hood.

BRIEF DESCRIPTION OF THE DRAWINGS

FIG. 1A is a schematic perspective view showing a part of a vehicle provided with a movable cowl cover in accordance with an embodiment of the present invention with the cowl cover being opened, FIG. 1B is a view similar to FIG. 1A but showing the condition when the cowl cover is closed, FIG. 2 is a cross-sectional view taken along line A—A in FIG. 1B, FIG. 3 is a cross-sectional view taken along line B—B in FIG. 1B, FIG. 4 is a cross-sectional view similar to FIG. 2 but showing the condition when the cowl cover is opened, FIG. 5 is a cross-sectional view similar to FIG. 3 but showing the condition when the cowl cover is opened.

DESCRIPTION OF THE PREFERRED EMBODIMENTS

Figure 6:
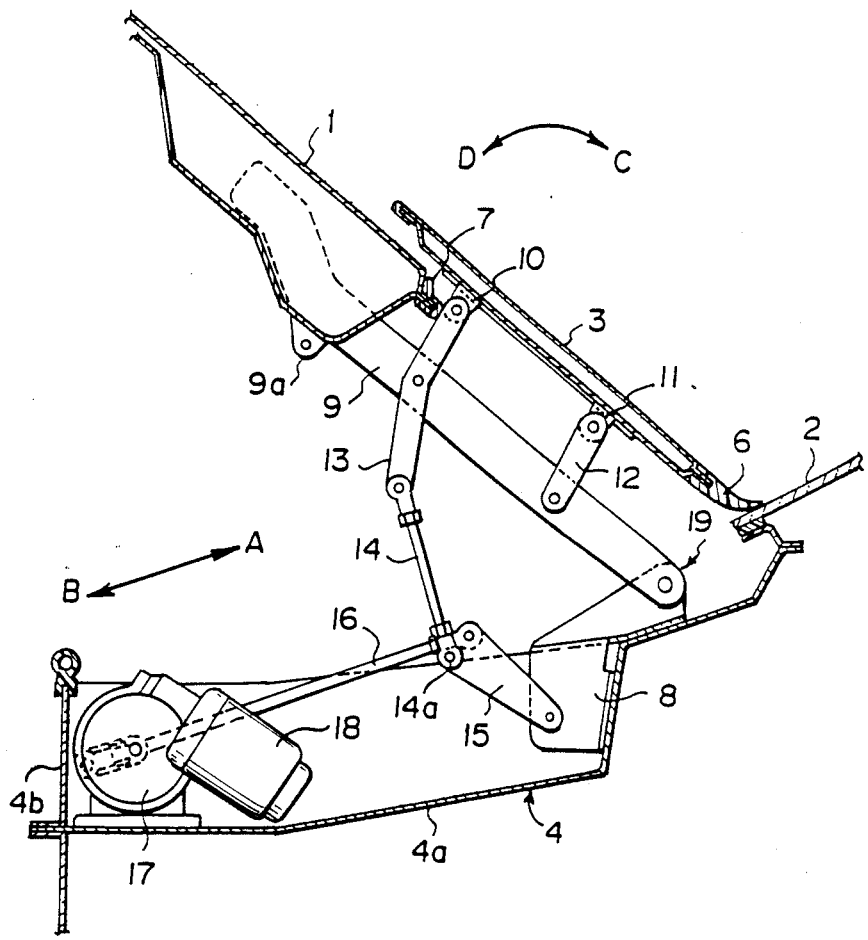
FIG. 6 is a cross-sectional view similar to FIG. 2 but showing the condition when the hood is opened.

As shown in FIG. 1A and 1B, a vehicle is provided with a cowl cover 3 between a hood 1 and a windshield 2 to extend along the lower edge of the windshield 2 between the left and right front fenders 5.

As shown in FIG. 2, the cowl cover 3 is provided at the rear edge thereof with a seal rubber 6 for sealing the space between the rear edge of the cowl cover 3 and the windshield 2 when the cowl cover 3 is closed. Further, the hood 1 is provided at the rear edge thereof with a seal rubber 7 for sealing the space between the rear edge of the hood 1 and the front edge of the cowl cover 3 to abut against the front edge of the cowl cover 3 when it is closed. The cowl cover 3 is for closing and opening a cowl box 4 defined below the cowl cover 3 by a dashboard upper panel 4a mounted on the vehicle body, a panel 4b projecting upward from the dashboard upper panel 4a and the like. The front edge of the cowl box 4 abuts against a portion of the hood 1 near the rear edge thereof, and the rear edge of the cowl box 4 is connected to the lower edge of the windshield 2.

Figure 11:
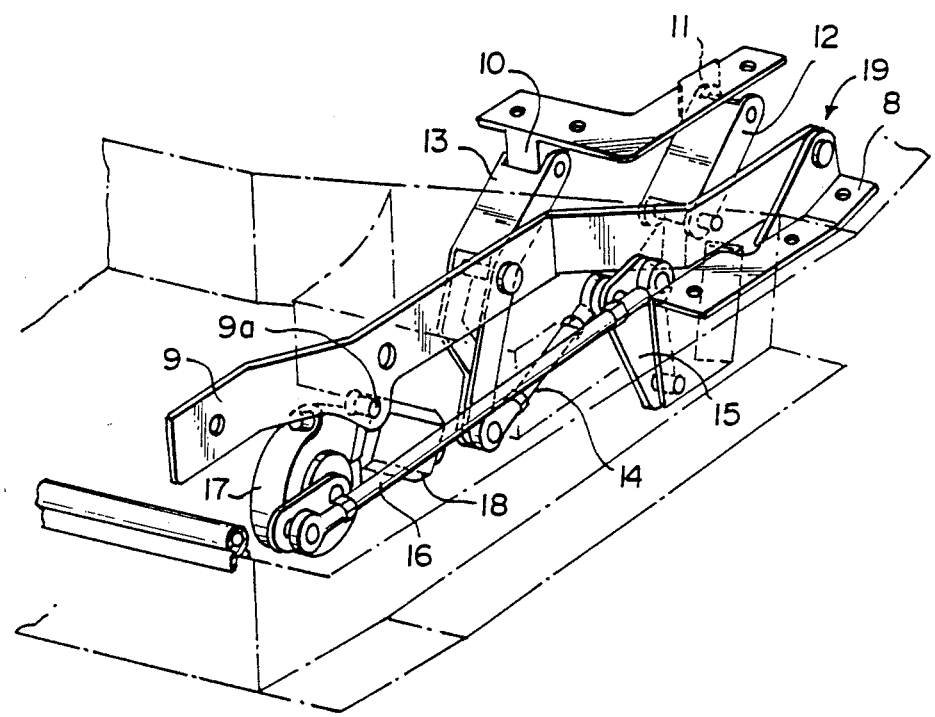
FIG. 11 is an enlarged exploded perspective view showing the driving mechanism of the movable cowl cover.

Cowl driving mechanisms for closing and opening the cowl cover 3 are provided on opposite sides of the cowl cover 3 as clearly shown in FIG. 1B As shown in FIG. 2 and 11 and as best shown in FIG. 11, each of the cowl cover driving mechanisms includes a hinge bracket 8 provided on one side of the rear portion of the cowl box 4. On the rear portion of the hinge bracket 8 is pivoted the rear end portion of a hood hinge bar 9 extending rearward from the rear edge portion of the hood 1. The hood hinge bar 9 and the hinge bracket 8 together form a hinge 19 A projection is formed on the front end portion of the hood hinge bar 9 to project downward, and a tack pin 9a adapted to be fitted into an engagement hole 14a of a follower rod 14 (to be described later) is provided on the projection.

Front and rear link brackets 10 and 11 are formed on the lower surface of the cowl cover 3 respectively at the front and rear end portions of the cowl cover 3. The upper end portion of a follower link 12 is pivoted on the rear link bracket 11 and the lower end of the follower link 12 is pivoted on the hood hinge bar 9. The upper end portion of an opening and closing (driving) link 13 is pivoted on the front link bracket 10. The opening and closing link 13 is further pivoted on the hood hinge bar 9 at an intermediate portion.

Said follower rod 14 is pivoted on the lower end portion of the opening and closing link 13 at one end portion. An engagement hole 14a is formed on the other end portion of the follower rod 14, and the lower end portion of the follower rod 14 is removably pivoted on a front side portion of the upper end portion of a connecting or intermediate link 15 by way of the engagement hole 14a, the connecting link 15 being pivoted on the hinge bracket 8. On a rear side portion of the upper end portion of the connecting link 15 is pivoted the rear end portion of a driving rod 16 which extends in the longitudinal direction of the vehicle body. The front end portion of the driving rod 16 is connected to a worm gear 17 driven by a cowl driving motor 18.

A pair of wipers 20 are disposed in the cowl box 4 between the cowl cover driving mechanisms on opposite sides of the vehicle body as shown in FIG. 3. Each wiper 20 is mounted for rotation on a wiper bracket 21 provided in the cowl box 4 and is connected to a driving means not shown. A guide plate 22 for guiding the wipers 20 to the windshield 2 is provided between the wiper brackets 21 and the windshield 2.

When the wipers 20 are to be operated, the cowl cover 3 is opened. When the cowl cover 3 is opened, the cowl driving motor 18 is first energized as shown in FIG. 4 and the driving rod 16 is pushed in the direction of arrow A by way of the worm gear 17 with the rotational speed of the driving motor 18 being reduced by the worm gear 17. The connecting link 15 is thereby rotated in the direction of arrow C and the follower rod 14 is driven in the direction of the arrow A. Thus, the lower end portion of the opening and closing link 13 is pulled by the follower rod 14 in the direction of the arrow A and the opening and closing link 13 is rotated in the direction of arrow D, whereby the cowl cover 3 is opened. At this time, the follower link 12 is rotated following the opening and closing link 13 in the direction of the arrow D carrying the rear portion of the cowl cover 3. When the cowl cover 3 is opened, a space is formed between the cowl cover 3 and the windshield 2 and the wipers 20 are moved toward the windshield 2 through the gap. When the wipers 20 are concealed, the cowl cover 3 is closed in the reverse procedure.

When the hood 1 is opened with the cowl cover 3 being closed as shown in FIG. 2, the hood 1 is rotated in the direction of the arrow C about the junction of the hinge bar 9 to the hinge bracket 8 and the cowl cover 3 is rotated along with the hood 1. At this time, the connecting link 15 is not rotated since it is connected to the worm gear 17 by way of the driving rod 16. Accordingly, the opening and closing link 13 is pulled by the follower rod 14 and is rotated, whereby the cowl cover 3 is opened. At this time, the follower link 12 rotates in the direction of the arrow D carrying the rear portion of the cowl cover 3. The hood 1 is closed in the reverse procedure and the cowl cover 3 is closed in response to closure of the hood 1.

Figure 7A:
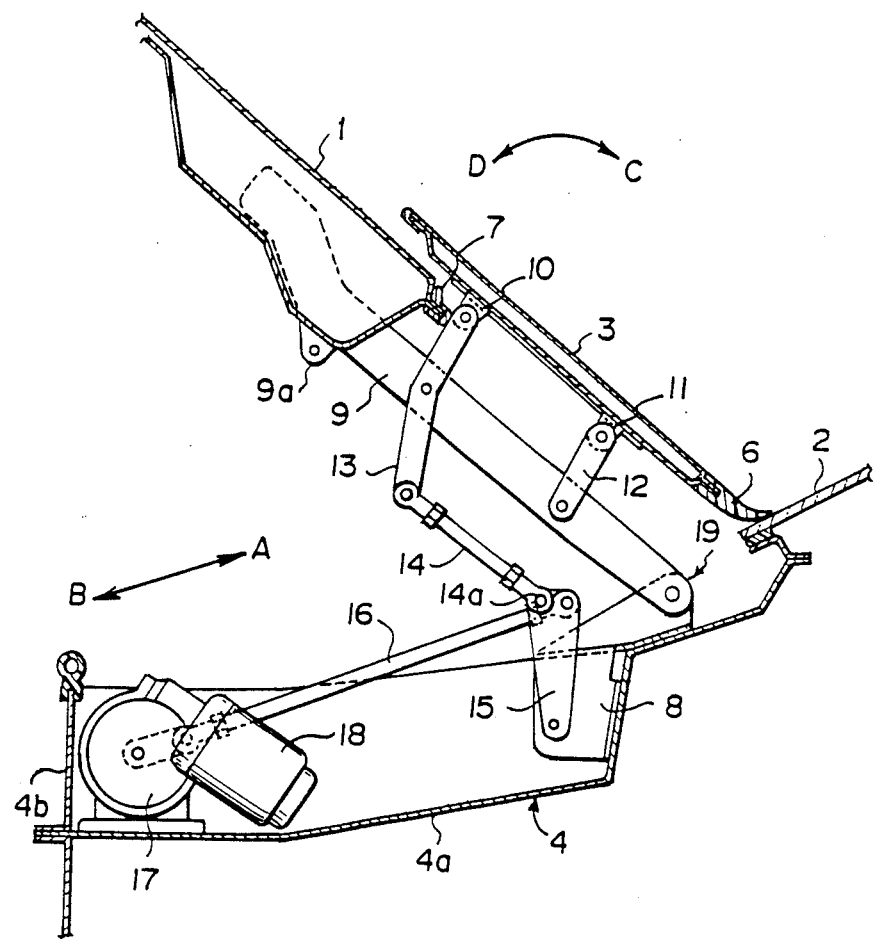
FIG. 7A is a cross-sectional view for illustrating the condition when the hood is opened with the cowl cover having been opened.
Figure 7B:
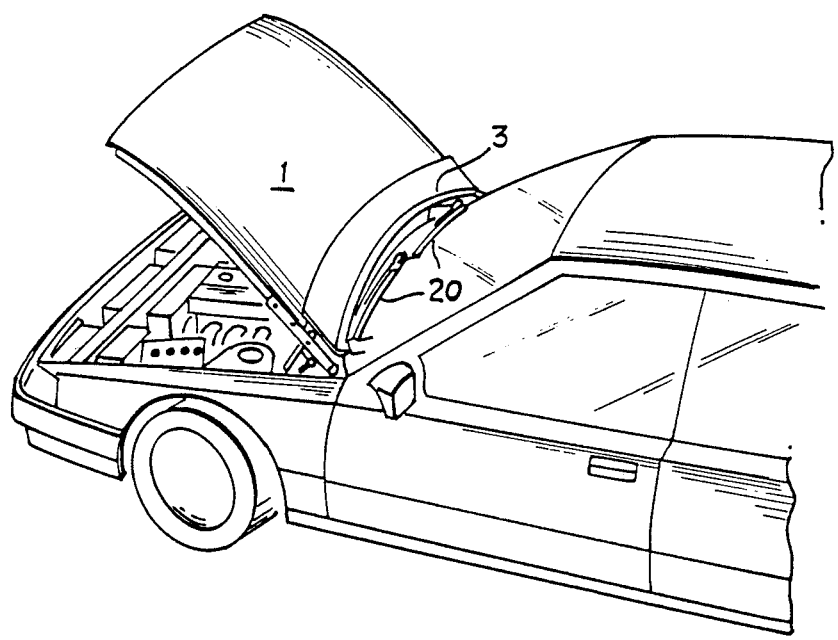
FIG. 7B is a perspective view of a part of the vehicle shown in FIG. 1A but showing the condition when the hood is opened.
Figure 8:
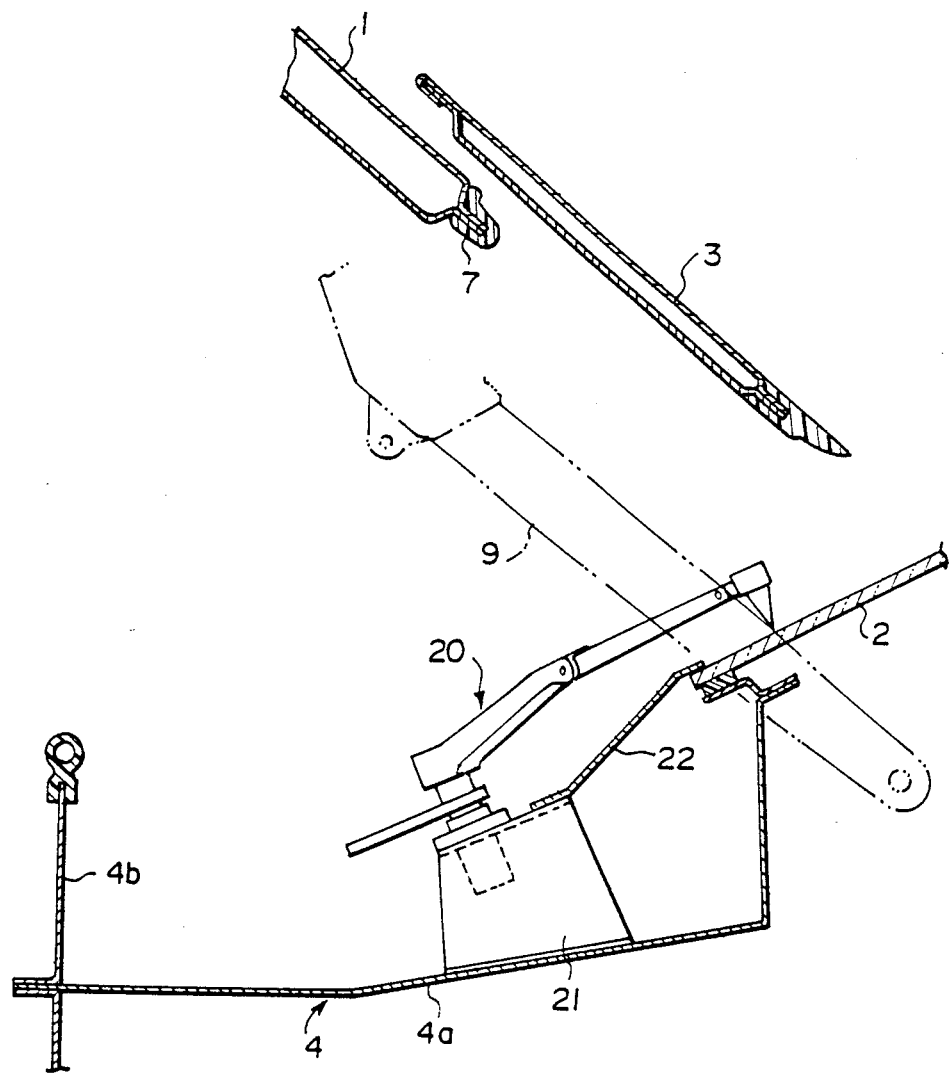
FIG. 8 is a cross-sectional view similar to FIG. 5 but showing the condition when the hood is opened.

When the hood 1 is opened with the cowl cover 3 being opened and the wipers 20 being operated as shown in FIG. 4, the hood 1 is rotated in the direction of the arrow C about the junction of the hood hinge bar 9 to the hinge bracket 8 in the same manner as described above and the cowl cover 3 is rotated along with the hood 1 keeping its position relative to the hood 1 as shown in FIG. 7A. In this state, the seal rubber 6 on the rear edge of the cowl cover 3 is spaced from the windshield 2 at the middle portion (as viewed in the transverse direction of the vehicle body) of the cowl cover 3 to permit operation of the wipers 20 though the seal rubber 6 is in contact with the windshield 2 at the portions near the sides of the vehicle body as can be understood from FIGS. 7A, 7B and 8. When the hood 1 is closed, the hood 1 and the cowl cover 3 return to the respective positions before the opening of the hood 1 in the reverse procedure.

As can be understood from the description above, the cowl cover 3 is opened by a large amount when the hood 1 is opened, thereby facilitating access to the mechanism such as the cowl driving motor 18 in the case of failure.

Figure 9:
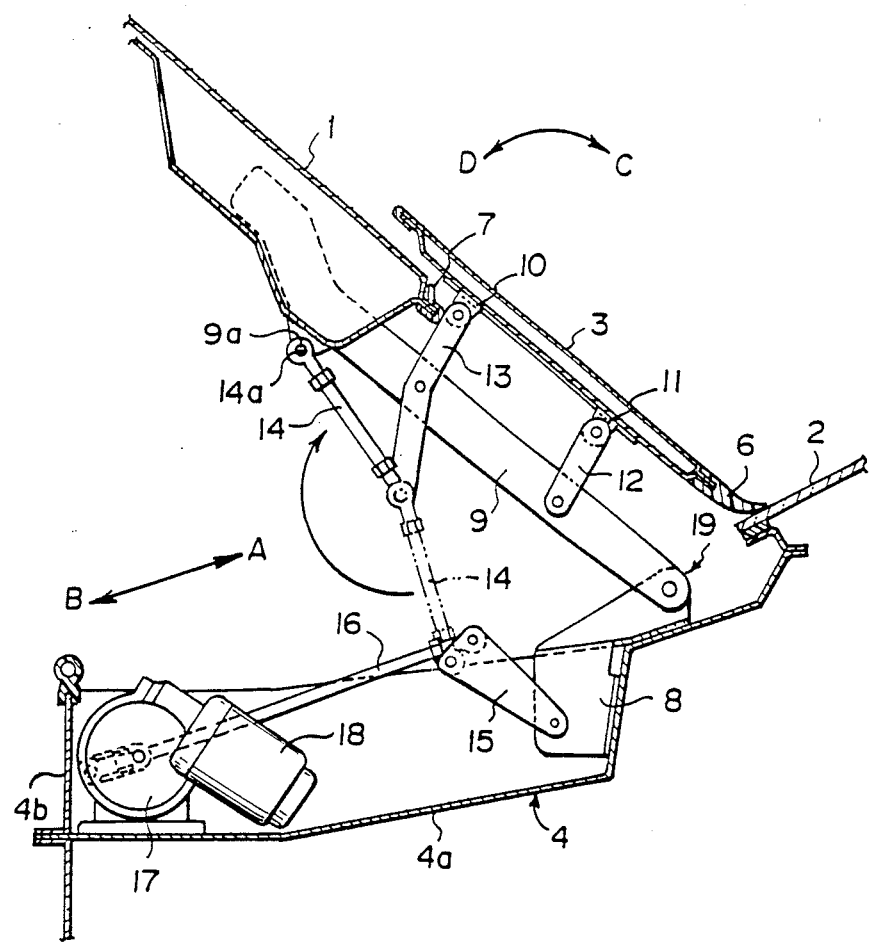
FIG. 9 is a cross-sectional view for illustrating provision provided in the embodiment for a failure of the driving mechanism of the cowl cover.
Figure 10:
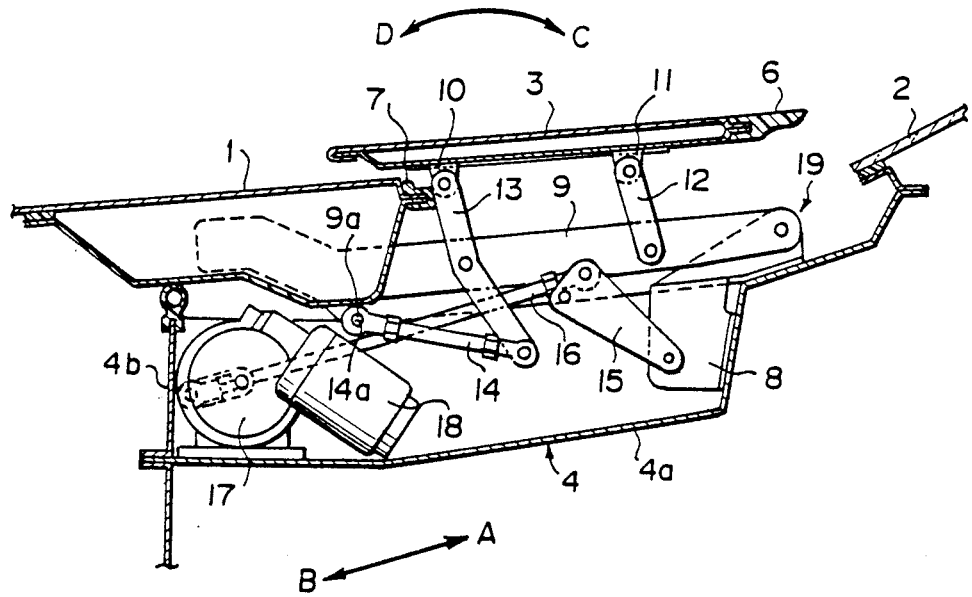
FIG. 10 is a view similar to FIG. 9 but showing the condition when the hood is closed.

In the case of a failure of the driving mechanism of the cowl cover 3, the lower end portion of the follower rod 14 is removed from the connecting link 15 and the engaging hole 14a of the follower rod 14 is brought into engagement with the tack pin 9a on the hood hinge bar 9 as shown in FIG. 9 to support the follower rod 14 for rotation about the tack pin 9a, whereby the cowl cover 3 can be kept opened not to prevent operation of the wipers 20.

FIGS. 12 to 16 show another embodiment of the present invention. In FIGS. 12 to 16, parts analogous to the parts shown in FIGS. 1 to 11 are given the same reference numerals and will not be described in detail here. Further, FIGS. 13 to 16 are synthesized based on crosssectional views taken along line A—A in conjunction with line C—C as shown in FIG. 1B.

A hinge bracket 26 (FIG. 13) is provided at a rear portion of the cowl box 4 on each side of the vehicle body. The rear end portion of a hood hinge bar 9 is pivoted on the hinge bracket 26. An opening and closing link 13 is pivoted on the hood hinge bar 9 at an intermediate portion and on a link bracket 27 provided on the lower surface of the cowl cover 3 at one end portion. The other end portion of the opening and closing link 13 is pivoted on one end portion of a follower link 14, and the other end portion of the follower rod 14 is pivoted on a front side portion of the upper end portion of a connecting link 15. The lower end portion of the connecting link 15 is pivoted on a cowl box side link bracket 28 provided on the cowl box 4 positioned lower than the hinge bracket 26 and forwardly spaced from the hinge bracket 26.

Figure 12:
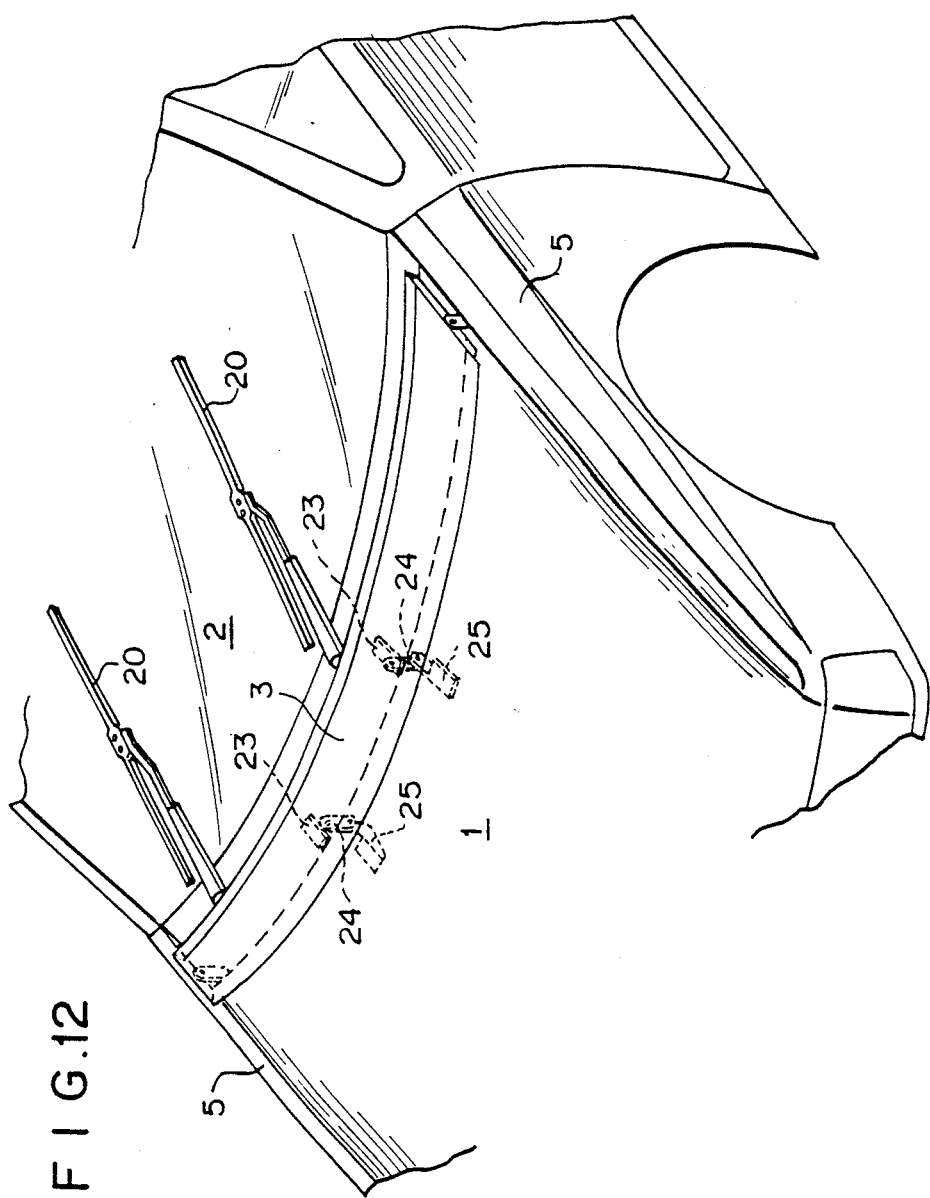
FIG. 12 is a view similar to FIG. 1A but showing another embodiment of the present invention.

A link bracket 23 is mounted on the lower surface of the cowl cover 3 inwardly spaced from the opening and closing link 13 as clearly shown in FIG. 12. A follower link 24 is pivoted on the link bracket 23 at one end portion thereof. The other end portion of the follower link 24 is pivoted on a link mounting stay 25 mounted on the lower surface of the hood 1. In this embodiment, the cowl cover 3 is supported by the hood hinge bars 9 at opposite sides thereof and by the link mounting stays 25 at portions near the middle thereof. Similarly to the preceding embodiment, the cowl cover 3 is opened by a cowl driving motor 18 by way of a worm gear 17, driving rod 16, the connecting link 15, the follower rod 14 and the opening and closing link 13. When the cowl cover 3 is opened, the intermediate portion of the cowl cover 3 is swung supported by the follower links 24.

Figure 13:
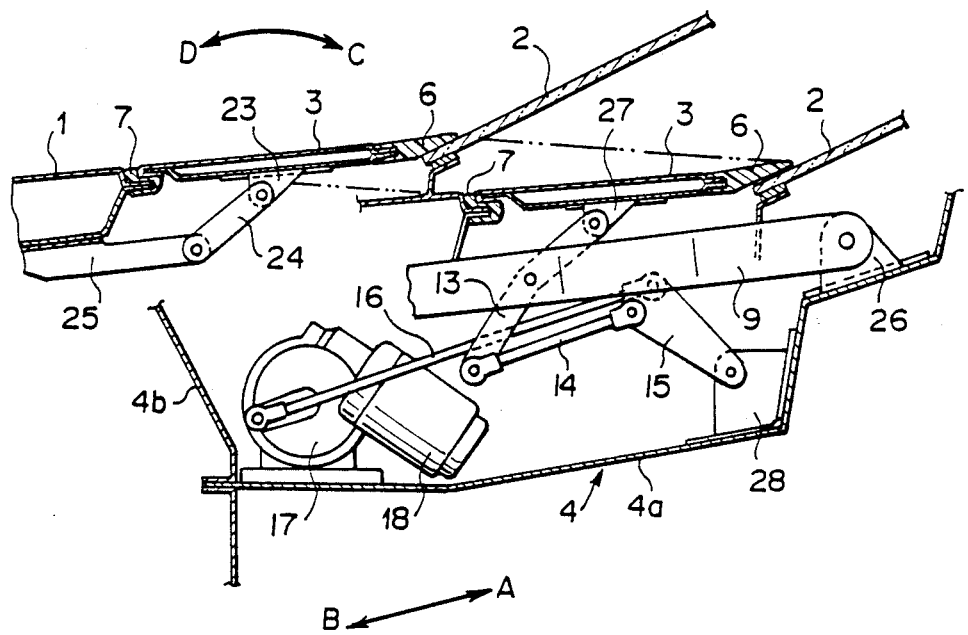
FIG. 13 is a cross-sectional view taken along independent planes connected by double-dot-dash lines showing the structure of the cowl cover of the embodiment.
Figure 14:
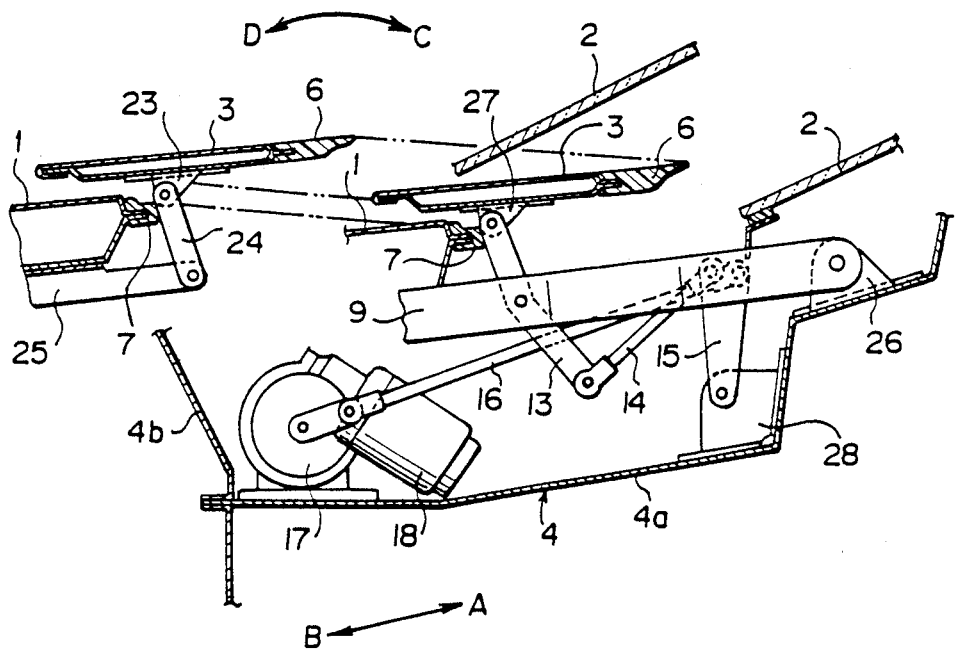
FIG. 14 is a cross-sectional view taken along independent planes connected by double-dot-dash lines showing the condition when the cowl cover is opened.
Figure 15:
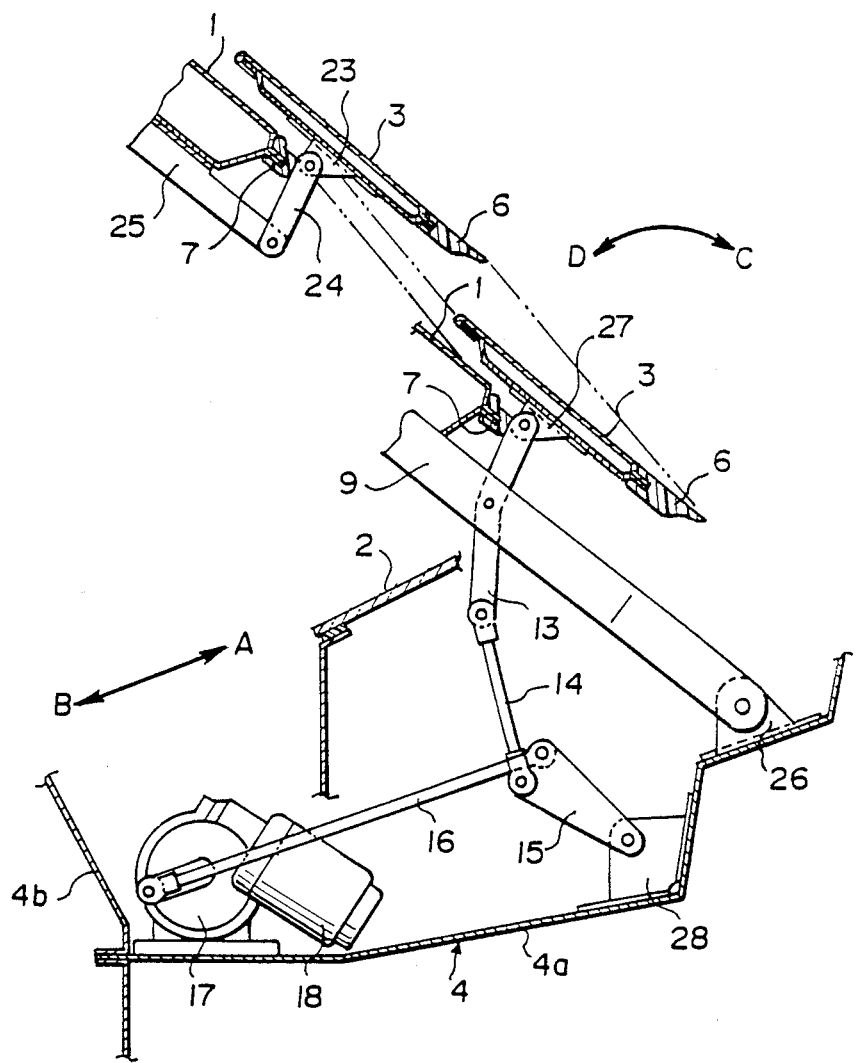
FIG. 15 is a cross-sectional view taken along independent planes connected by double-dot-dash lines showing the condition when the hood is opened with the cowl cover being closed.
Figure 16:
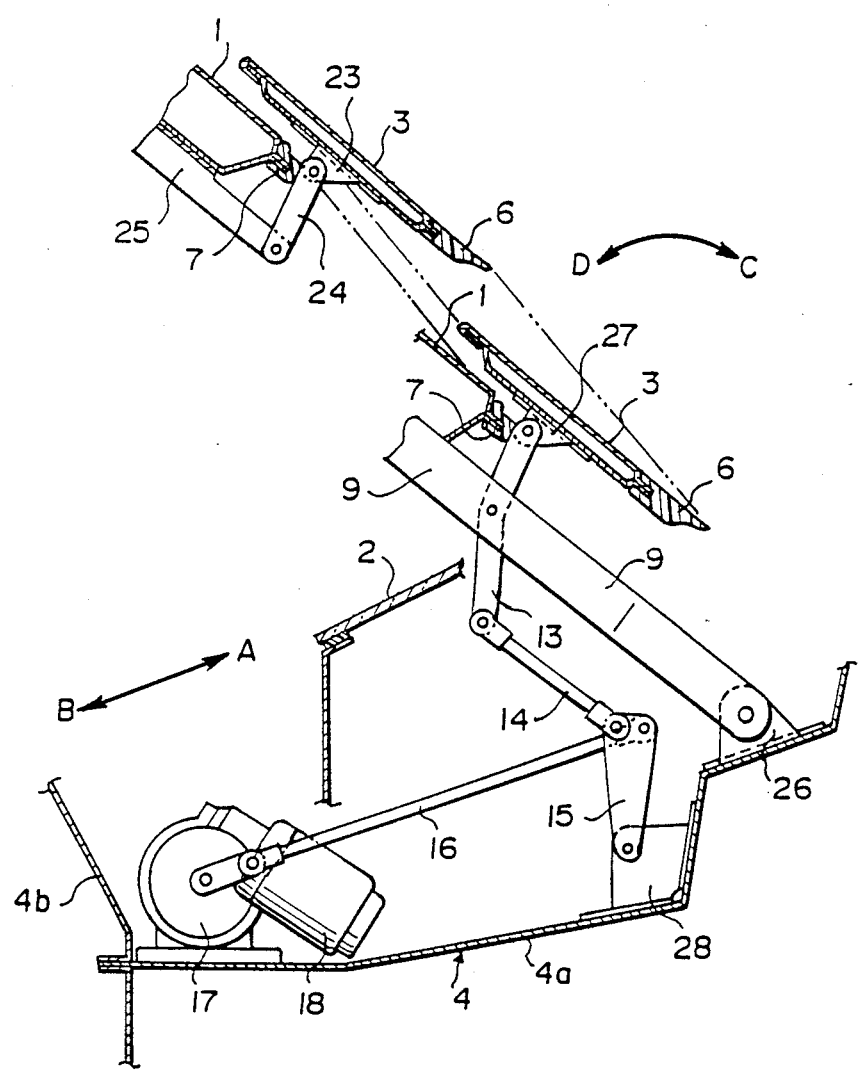
FIG. 16 is a cross-sectional view taken along independent planes connected by double-dot-dash lines showing the condition when the hood is opened with the cowl cover having been opened.

FIG. 15 shows the condition when the hood 1 is opened with the cowl cover 3 is closed as shown in FIG. 13, and FIG. 16 shows the condition when the hood 1 is opened with the cowl cover 3 is opened as shown in FIG. 14.

We claim:

1. A movable cowl cover for selectively opening and closing a cowl box provided in a vehicle body between a rear edge of a front hood and a windshield, the front hood being mounted on the vehicle body to be swung open and closed about a hinge mounted on the vehicle body on a rear side of the rear edge of the front hood, said cowl cover characterized by being opened and closed by a driving mechanism comprising a four-bar link mechanism including first and second links each of which is pivoted at one end thereof on hood extensions means mounted on the front hood and at the other end to structure on the lower surface of the cowl cover and which extend substantially in parallel spaced from each other in the longitudinal direction of the vehicle body, a driving means and a connecting mechanism for transmitting the output power of the driving means to the four-bar link mechanism.

2. A movable cowl cover as defined in claim 1 in which the rear edge of the cowl cover is provided with a seal rubber adapted to abut against the windshield when the cowl cover is closed.

3. A movable cowl cover as defined in claim 1 in which said connecting mechanism is arranged to pivot the four-bar link mechanism forwardly when the front hood is opened.

4. A movable cowl cover as defined in claim 1 in which said front hood is provided at the rear edge thereof with a seal rubber adapted to abut against the front edge of the cowl cover when the cowl cover is closed.

5. A movable cowl cover as defined in claim 4 in which at least one of said first and second links is adapted to abut against the seal rubber when the cowl cover is opened.

6. A movable cowl cover as defined in claim 1 in which said hood extension means includes a bar is mounted on the lower surface of the front hood to extend rearward beyond the rear edge thereof and said first and second links are pivoted on the bar to extend substantially in parallel to each other.

7. A movable cowl cover as defined in claim 6 in which said bar is a hinge bar pivoted on the vehicle body at the rear end thereof, and said first link has an extension extending downward below the hinge bar, said connecting mechanism being connected to the extension of the first link.

8. A movable cowl cover as defined in claim 1 in which said hood extension means includes a bar and a stray, said bar being mounted on the lower surface of the front hood at a portion near one side of the front hood to extend rearward beyond the rear edge thereof, said first link being pivoted on the bar and said second link being pivoted on said stray on the lower surface of the front hood at a portion transversely offset from the first link.

9. A movable cowl cover as defined in claim 8 in which said bar is a hinge bar pivoted on the vehicle body at the rear end thereof, and said first link has an extension extending downward below the hinge bar, said connecting mechanism being connected to the extension of the first link.

10. A movable cowl cover as defined in claim 1 in which said connecting mechanism comprises an intermediate link pivoted on the cowl box, a follower rod connecting the intermediate link with said first link, and a driving rod connecting the intermediate link with the driving means.

11. A movable cowl cover as defined in claim 10 in which said intermediate link is pivoted on the vehicle body to be movable back and forth at one end and said driving rod and the follower rod are connected to the other end of the intermediate link at one of their respective ends.

12. A movable cowl cover as defined in claim 11 in which said intermediate link is pivoted on a hinge bracket on which a hinge bar mounted on the front hood is pivoted.

13. A movable cowl cover as defined in claim 11 in which said follower rod is removably mounted on the intermediate link at said one end.

14. A movable cowl cover as defined in claim 13 in which a temporary engagement portion which is adapted to be engaged with said one end of the follower rod is provided on the front hood side, the follower rod being adapted to hold said four-bar link mechanism in a position in which the cowl cover is opened when said one end thereof is engaged with the temporary engagement portion.

15. A movable cowl cover as defined in claim 11 in which said connecting mechanism is arranged to pivot the four-bar link mechanism forwardly when the front hood is opened.

16. A movable cowl cover as defined in claim 10 in which said hood extension means includes a bar is mounted on the lower surface of the front hood to extend rearward beyond the rear edge thereof and said first and second links are pivoted on the bar to extend substantially in parallel to each other.

17. A movable cowl cover as defined in claim 10 in which said hood extension means includes a bar and a stray, said bar being mounted on the lower surface of the front hood at a portion near one side of the front hood to extend rearward beyond the rear edge thereof, said first link being pivoted on the bar and said second link being pivoted on said stay on the lower surface of the front hood at a portion transversely offset from the first link.

18. A movable cowl cover as defined in claim 1 in which the rear edge of the front hood is positioned under the front edge of the cowl cover.

19. A movable cowl cover as defined in claim 1 in which said driving means is mounted on the vehicle body side.

* * * * *